UNITED STATES PATENT OFFICE.

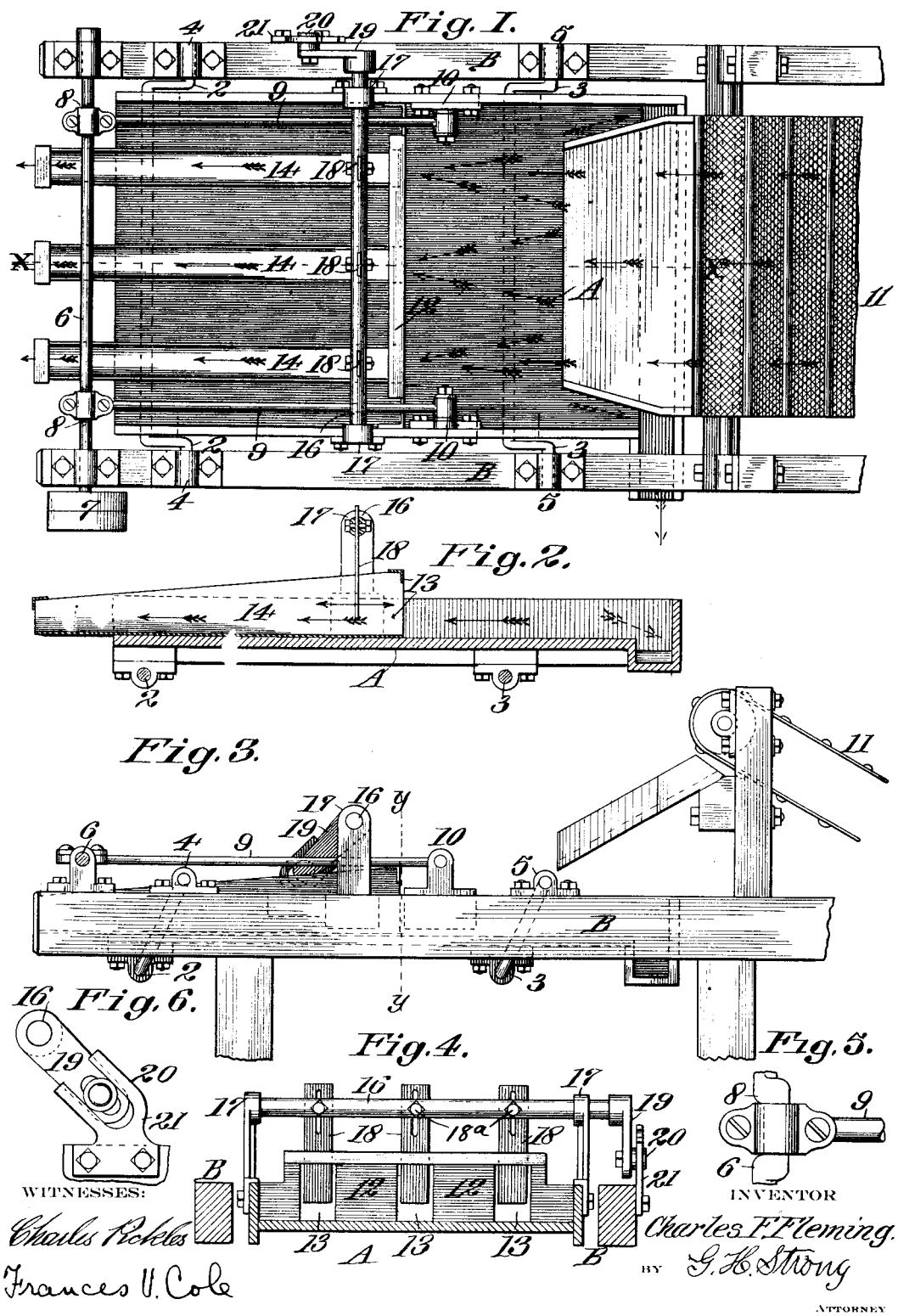

CHARLES F. FLEMING, OF SAN JOSE, CALIFORNIA.

AUTOMATIC FEEDING-MACHINE.

1,120,299.  Specification of Letters Patent.  Patented Dec. 8, 1914.

Application filed October 14, 1912. Serial No. 725,658.

*To all whom it may concern:*

Be it known that I, CHARLES F. FLEMING, a citizen of the United States, residing at San Jose, in the county of Santa Clara and State of California, have invented new and useful Improvements in Automatic Feeding-Machines, of which the following is a specification.

This invention relates to an automatic feeding machine, particularly constructed to handle granular materials of all kinds as grains, fruits, seeds, foods, etc.

The device is constructed and adapted for use in connection with weighing or packing machines to the extent that it delivers the material to be weighed or packed to the receiving hopper of a weighing or packing machine, but it may be used where a uniform delivery of the product handled is desired.

The object of the invention is to provide a simple, inexpensive and reliable machine of the general class or character specified having a receiving table for the material under treatment provided with means for packing or settling said material to a certain depth and density while being fed through the machine, from the delivery or receiving end thereof to the discharge end, and for regulating the quantity of material thus fed.

The invention consists of the parts and the construction and combination of parts as hereinafter more fully described and claimed, having reference to the accompanying drawings, in which—

Figure 1 is a detail plan view. Fig. 2 is a detail vertical section on the line $x$—$x$, Fig. 1. Fig. 3 is a detail side elevation. Fig. 4 is a transverse vertical section on line $y$—$y$, Fig. 3. Fig. 5 is a detail plan view of the eccentric. Fig. 6 is a detail elevation of the driving crank.

A indicates a table, hung in a pair of crank arms 2 and 3 which are appropriately journaled in bearings 4 and 5 mounted on a rigid main supporting frame B. Mounted at right angles to the table upon the main frame is a driven shaft 6, upon which is secured a pulley 7 whereby power may be imparted to drive the shaft. Upon the shaft are formed one or more eccentrics or crank portions 8, to which are connected rods 9 which are secured appropriately to the table, as at 10. Thus as the shaft 6 is revolved, the crank portions will revolve and reciprocate or shake the entire table structure.

11 indicates a conveyer belt which continuously delivers the granular material to the table. The reciprocating or shaking movement, together with the angle of the table, causes the material being handled to travel in the direction of the arrows shown in the plan view Fig. 1.

The material, after being delivered on the table, will constantly advance in the direction already indicated until it strikes an upright baffle-plate 12 placed crosswise of the table. This is provided with a suitable number of openings 13 which connect with a similar number of troughs 14 through which the material will pass and discharge into the measuring hoppers, or other receptacles, not here shown. The vibration of the table accomplishes two distinct functions. It not only feeds the material to the measuring hoppers or receptacles, as has already been explained, but it performs another function of equal importance, which is the packing of the material to a certain density and depth caused by the constant and rapid vibration to which the material is subjected while passing over the table surface. We have now seen how the material is packed to a uniform density and depth while being fed over the table surface.

In order to adjust the flow or amount of material passing through the troughs to the measuring hoppers or receptacles, I have provided a shaft 16, appropriately mounted in suitable bearings 17 which are carried by the table. Upon this shaft is adjustably secured a number of blades 18 which project down into the feed troughs. These are adjustable, as shown at 18$^a$, so that they may be raised or lowered into the troughs to regulate the amount of material passing through the troughs to the measuring hoppers or receptacles. Mounted on the outer end of the shaft 16 is a crank arm 19, provided with a roller 20 which is engaged by guide arms 21 forming part of an adjustable bracket secured to the main frame. This will impart a rocking motion to the shaft 16 dependent on the table motion, and will cause the blades 18 to swing back and forth in the troughs 14, throwing back all excess material fed into the troughs. From this it can be seen that the adjustment of the blades 18 regulates the depth or amount of material passing through the feed troughs.

In operation, the material to be measured is elevated by the conveyor from a suitable source of supply, not here shown, and deposited on the table where it is constantly fed forward, as described. All excess material not being able to pass through the feed troughs is thrown back and falls into the return conveyers or troughs not here shown from where it is returned to the source of supply. The quantity of material passing through the feed troughs being controlled by the blades or beaters secured to the rocker-shaft 16, may be increased or decreased at any time by raising or lowering the blades; this being necessary when it is desired to increase or decrease the measured quantity in the measuring hoppers or receptacles, to which the material is delivered.

One great advantage accomplished by this machine over other machines heretofore constructed is the delivery of a measured quantity of material packed to a certain depth and density. This insures great uniformity in weight of each measured quantity discharged from the measuring hoppers, a result which is very desirable as it eliminates all excess material over the amount required for weighing, packing, or measuring.

The apparatus is simple and substantial in its construction and reliable in its actions and takes no more space than an ordinary machine. The materials and finish of the several parts of the apparatus are such as experience and judgment of the manufacturers may dictate.

I wish it understood that various changes in form, proportions and minor details of construction may be resorted to within the scope of the appended claims, and that I do not wish to limit myself to the specific design and construction here shown.

Having thus described my invention, what I claim and desire to secure by Letters Patent is—

1. In an apparatus of the character described, a horizontally suspended table, means to deliver material upon one end thereof, mechanism by which a longitudinal oscillatory motion is communicated to the table, a baffle plate disposed transversely across the table and provided with openings and longitudinally disposed troughs communicating with the openings, and open to discharge at the opposite end of the table.

2. An apparatus comprising a horizontally suspended table having means to oscillate it longitudinally, an oscillatory shaft journaled transversely above the table having blades dependent therefrom, a baffle plate transverse to the table and provided with openings, and troughs communicating with the plate openings, into which troughs the blades extend.

3. An apparatus consisting of a horizontally suspended table, adapted to receive the material under treatment, mechanism to produce a longitudinally oscillating motion of said table, a transverse baffle plate, troughs extending from said plate to the discharge end of the table, a shaft journaled transversely above the table, blades extending from the shaft into the troughs, a rocker arm upon the shaft, and connections by which said shaft is oscillated and the blades are correspondingly moved in the troughs.

4. An apparatus consisting of a horizontally suspended table, adapted to receive the material under treatment, mechanism to produce a longitudinally oscillating motion of said table, a transverse baffle plate, troughs extending from said plate to the discharge end of the table, a shaft journaled transversely above the table, blades extending from the shaft into the troughs, a rocker arm upon the shaft, and connections by which said shaft is oscillated and the blades are correspondingly moved in the troughs, said blades being vertically adjustable with relation to the troughs.

In testimony whereof I have hereunto set my hand in presence of two subscribing witnesses.

CHARLES F. FLEMING.

Witnesses:
V. T. McCURDY,
T. G. BARNETT.